(12) United States Patent
Suzuki

(10) Patent No.: US 6,736,549 B2
(45) Date of Patent: May 18, 2004

(54) OPTICAL FIBER FITTING

(75) Inventor: Masayuki Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 10 days.

(21) Appl. No.: 10/166,181

(22) Filed: Jun. 11, 2002

(65) Prior Publication Data
US 2002/0186933 A1 Dec. 12, 2002

(30) Foreign Application Priority Data
Jun. 12, 2001 (JP) ........................................ 2001-176619

(51) Int. Cl.$^7$ ................................................ G02B 6/36
(52) U.S. Cl. .......................................... 385/78; 385/138
(58) Field of Search .............................. 385/53–87, 138

(56) References Cited

U.S. PATENT DOCUMENTS

| | | | | |
|---|---|---|---|---|
| 4,161,348 A | * | 7/1979 | Ulrich | ........................ 385/115 |
| 4,673,242 A | * | 6/1987 | Logan et al. | .................. 385/84 |
| 4,674,833 A | * | 6/1987 | Des Forges et al. | .......... 385/85 |
| 4,711,517 A | * | 12/1987 | Fentress et al. | ................ 385/85 |
| 5,088,804 A | * | 2/1992 | Grinderslev | .................. 385/81 |
| 5,574,815 A | * | 11/1996 | Kneeland | ..................... 385/101 |
| 5,671,310 A | * | 9/1997 | Lin et al. | ....................... 385/78 |

* cited by examiner

Primary Examiner—Hermang Sanghavi
Assistant Examiner—Scott A Knauss
(74) Attorney, Agent, or Firm—McGinn & Gibb, PLLC

(57) ABSTRACT

An optical fiber fitting includes a cylindrical sleeve having a first annular groove extending normal to the axial direction on the inner surface of the cylindrical sleeve, a rod member having a plurality of channels each extending in the axial direction and receiving therein an optical fiber and a second annular groove extending normal to the axial direction, and a C-shape spring, having a radially outer surface received in the first annular groove and a radially inner surface received in the second annular groove, for locking the rod member with the cylindrical sleeve.

18 Claims, 4 Drawing Sheets

OPTICAL FIBER FITTING

BACKGROUND OF THE INVENTION (a) Field of the Invention

The present invention relates to an optical fiber fitting and, more particularly, to the locking structure of an optical fiber fitting used for introducing an optical fiber into an optical device.

(b) Description of the Related Art

An optical device, such as an optical repeater used for a submarine cable in an optical communication system, may be associated with an optical fiber fitting having an encapsulation structure or airtight structure and used for introducing optical fibers into the optical device.

FIG. 1 shows an example of a conventional optical fiber fitting. The optical fiber fitting, generally designated by numeral 10A, includes a metallic sleeve 11 fixed to an optical repeater (shown by dotted line), which is disposed at the front end of the fitting 10A, i.e., the bottom of the fitting 10A in the figure. A metallic rod 17 mounting thereon optical fibers 12 has a part received within the metallic sleeve 11.

FIG. 2 shows the structure of the interior of the metallic sleeve 11, whereas FIG. 3 shows the metallic sleeve of FIG. 2 in a front view thereof. The metallic sleeve 11 is of a hollow cylinder, the front end of which is provided with a front plug 16 formed as a unitary body therewith, as shown in FIG. 2. The front plug 16 is used as a stopper for the metallic rod 17. A flange member 14 is provided on the outer surface of the metallic sleeve 11 in the vicinity of the front end of the metallic sleeve 11 for fixing the optical fiber fitting 10A onto the optical device. Four through-holes 15 are formed in the front plug 16 of the metallic sleeve 11 in this example, as shown in FIG. 3, for allowing four optical fibers to pass therethrough.

FIG. 4 is a side view of the metallic rod 17, and FIG. 5 is the front view thereof. The metallic rod 17 has a front cylinder 17A received within the metallic sleeve 11, a rear cylinder (or rear disk) 17B disposed outside the metallic cylinder 11 and having thereon a plurality of fiber channels 19 arranged at a constant angular pitch, and a coupling column 17C coupling together the rear cylinder 17A and the front cylinder 17B. As illustrated in FIG. 5, the rear cylinder 17B has four fiber channels 19 on the outer periphery thereof.

The optical fibers 12 shown in FIG. 1 are received in the respective fiber channels 19 of the rear cylinder 17B, and also received in respective channels 21 formed on the outer surface of the front cylinder 17A of the metallic rod 17. The channels 19 and 21 of the metallic rod 17 extend in the axial direction of the optical fiber fitting 10A. The optical fiber 12 is stripped of the overcoat between the rear cylinder 17B and the front cylinder 17A of the metallic rod 17 to expose the core of the optical fiber 12.

FIG. 1 illustrates the combination structure wherein the metallic rod 17 attached with optical fibers 12 are received in the metallic sleeve 11. For obtaining the combination structure of FIG. 1, the optical fibers 12 are first fixed onto the metallic rod 17 shown in FIG. 4, and then inserted into the metallic sleeve 11 together with the metallic rod 17. Before this step, the forward portions of the optical fibers 12 to reside below the channels 21 of the metallic rod 17 are allowed to pass through the respective through-holes 15 of the metallic sleeve 11 in advance toward the interior of the optical device. The metallic rod 17 of FIG. 4 is attached with the optical fibers 12 in advance, which are fixed onto the rear cylinder 17B of the metallic rod 17 with adhesive 23.

The front cylinder 17A of the metallic rod 17 is forwarded to be stopped by the rear surface of the front plug 16, and adhered thereto with adhesive 24. Subsequently, the rear portion of the gap between the inner surface of the metallic sleeve 11 and the outer periphery of the coupling column 17C of the metallic rod 17 is filled with a low-melting-point metal 25 for airtight.

In the conventional encapsulation structure of the optical fiber fitting 10A as described above, the work efficiency for obtaining the combination structure is relatively low due to the difficulty in the step of allowing the optical fibers 12 to pass through the respective through-holes 15 formed in the front plug 16.

SUMMARY OF THE INVENTION

In view of the above, it is an object of the present invention to provide a locking structure of an optical fiber fitting, which is capable of encapsulating optical fibers for airtight without a complicated work.

The present invention provides an optical fiber fitting including: a cylindrical sleeve having an inner surface, the inner surface having thereon a first annular groove extending normal to an axial direction of the cylindrical sleeve; a ring-like spring member having a radially outer surface received in the first annular groove, with a radially inner surface of the spring member protruding from the first annular groove; and a rod member having a cylindrical portion received in the cylindrical sleeve, the cylindrical portion having thereon at least one channel extending along the axial direction for receiving therein an optical fiber and a second annular groove extending normal to the axial direction and receiving therein the radially inner surface of the spring member, the spring member locking the rod member with the cylindrical sleeve.

In accordance with the optical fiber fitting of the present invention, the rod member and the cylindrical sleeve are locked by the function of the ring-like spring member and thus the front plug of the cylindrical member is not needed. This obviates the step of allowing the optical fibers to pass through the respective through-holes of the front plug of the cylindrical sleeve, and improves the work efficiency in the assembly of the optical fiber fitting.

The above and other objects, features and advantages of the present invention will be more apparent from the following description, referring to the accompanying drawings.

PREFERRED EMBODIMENTS OF THE INVENTION

Figure 1:
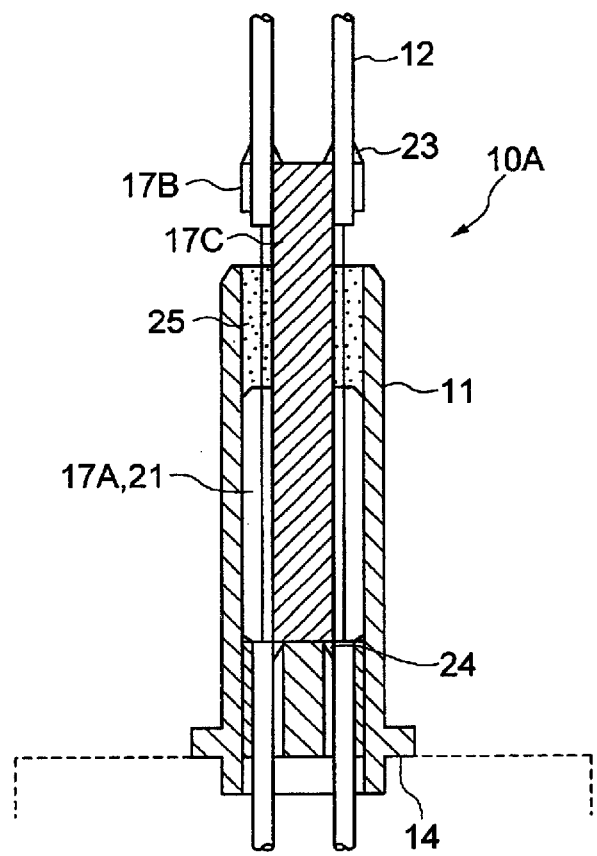
FIG. 1 is a longitudinal-sectional view of a conventional optical fiber fitting.
Figure 2:
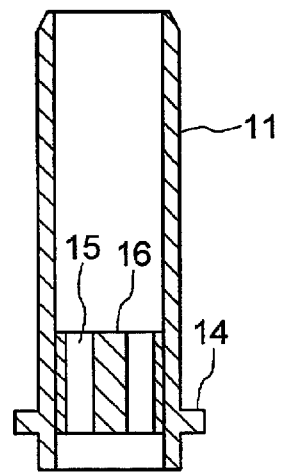
FIG. 2 is a longitudinal-sectional view of the metallic sleeve shown in FIG. 1.
Figure 3:
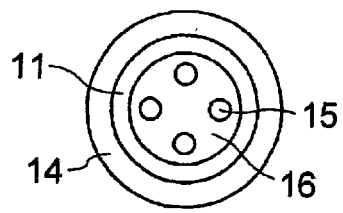
FIG. 3 is a front view of the metallic sleeve of FIG. 2.
Figure 4:
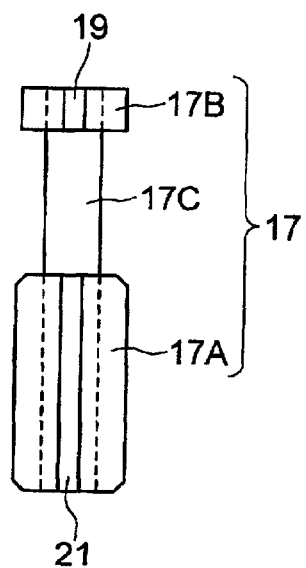
FIG. 4 is a side view of the metallic rod shown in FIG. 1.
Figure 5:
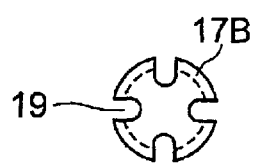
FIG. 5 is a rear view of the rear cylinder of the metallic rod of FIG. 4.

Now, the present invention is more specifically described with reference to accompanying drawings, wherein similar constituent elements are designated by similar reference numerals throughout the drawings.

Figure 6:
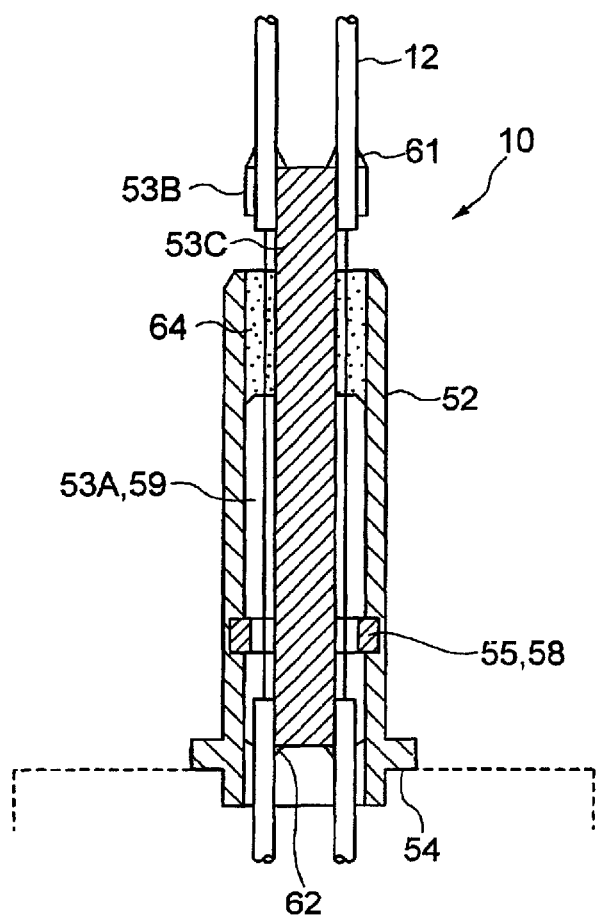
FIG. 6 is a longitudinal-sectional view of an optical fiber fitting according to an embodiment of the present invention.

Referring to FIG. 6, there is shown an optical fiber fitting according to an embodiment of the present invention. The optical fiber fitting, generally designated by numeral 10, includes a metallic sleeve 52 coupled to an optical repeater (shown by dotted line) disposed at the front side of the optical fiber fitting 10, or bottom side of the optical fiber fitting 10 as viewed in the drawing. A metallic rod 53 mounting thereon optical fibers 12 attached thereto has a part received within the metallic sleeve 52.

Figure 7:
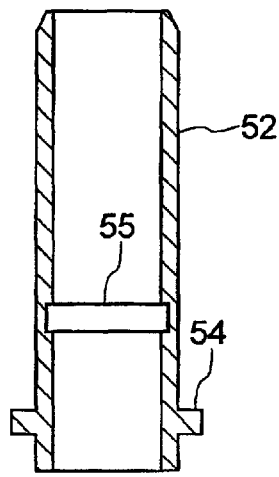
FIG. 7 is a longitudinal-sectional view of the metallic sleeve shown in FIG. 6.
Figure 8:
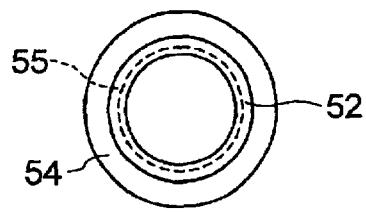
FIG. 8 is a front view of the metallic sleeve of FIG. 7.

Referring to FIGS. 7 and 8, the metallic sleeve 52 is of a hollow cylinder, the outer surface of which is provided with a flange member 54 in the vicinity of the front end of the metallic sleeve 52. The metallic sleeve 52 has an annular groove 55 formed on the inner surface of the metallic sleeve 52 and extending normal to the axial direction of the fitting 10. The annular groove 55 is located slightly above the flange member 54, and is of a rectangular shape in cross section thereof.

Figure 9:
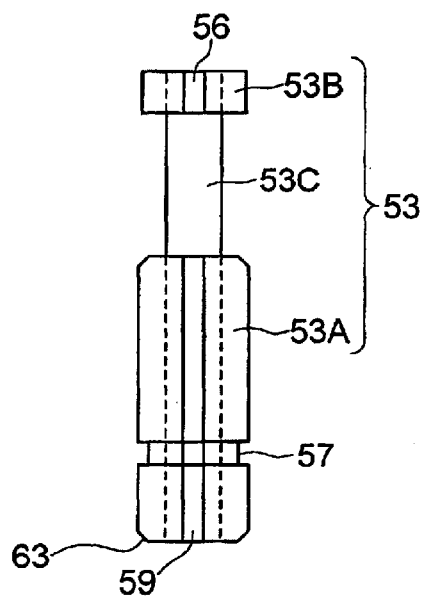
FIG. 9 is a side view of the metallic rod shown in FIG. 6.
Figure 10:
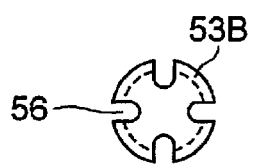
FIG. 10 is a rear view of the rear cylinder of the metallic rod of FIG. 9.

Referring to FIGS. 9 and 10, the metallic rod 53 includes a front cylinder 53A received within the metallic sleeve 52, a rear cylinder 53B having thereon a plurality of fiber channels 56, and a coupling column 53C coupling together the front cylinder 53A and the rear cylinder 53B. The coupling column 53C has a smaller diameter than the front cylinder 53A and the rear cylinder 53B.

Four fiber channels 56 are arranged on the outer periphery of the rear cylinder 53B at an angle of 90 degrees between each two of the fiber channels 56. The front cylinder 53A also has thereon four fiber channels 59 corresponding to the fiber channels 56 on the rear cylinder 53B. The front cylinder 53A has an annular groove 57 on the outer surface thereof in the vicinity of the front end thereof. The annular groove 57 and the annular groove 55 in combination receive therein a spring member 58 as shown in FIG. 6. The front surface of the front cylinder 53A has a chamfer 63 at the edge thereof.

Figure 11:
FIG. 11 is a top plan view of the spring member shown in FIG. 6.

Referring to FIG. 11, the spring member 58 is made of a metal and has a ring-like shape, which has a cutout in a ring to configure character "C". The ring-like spring member 58 has an outer diameter slightly smaller than the diameter of the bottom surface of the annular groove 55 formed in the metallic sleeve 52 upon no external force being applied to the spring member 58. The spring member 58, upon application of a radially outward force, may assume an outer diameter substantially the same as the diameter of the bottom surface of the annular groove 55, and may be received within the annular groove 55 in its entirety. The central opening of the spring member 58 can be used for passing the optical fibers 12 and the metallic rod 53.

To obtain the combination structure of the optical fiber fitting 10 as shown in FIG. 6, four optical fibers 12 are first received in the respective fiber channels 56 of the rear cylinder 53B of the metallic rod 53. The front end of each optical fiber extends beyond the front end of the front cylinder 53A to reach the interior of the optical device, e.g., optical repeater. In this step, the overcoat of each optical fiber 12 is removed in a specified length corresponding to the distance between the rear cylinder 53B and the front cylinder 53A to expose the core of the each optical fiber 12.

In an alternative, the overcoat may be removed at the portion of the optical fiber corresponding to the location in front of the rear cylinder 50B. The four fibers are adhered onto the rear cylinder 53B at the rear surface of the rear cylinder 53B with adhesive 61, and at the front surface of the front cylinder 53B with adhesive 62. The spring member 58 is inserted in the groove 55 of the metallic sleeve 52 in advance, with the radially inner surface of the spring member protruding from the inner surface of the metallic sleeve 52.

The metallic rod 53 attached with the optical fibers 12 is then inserted into the metallic sleeve 52, with the front surface of the front cylinder 53A being the head. After the front surface of the front cylinder 53A passes through the spring member 58, the spring member 58 is slightly extended radially outward by the function of the chamfer 63 of the front cylinder 53A.

When the metallic rod 53 advances to the specific position at which the annular groove 57 of the metallic rod 53 opposes the annular groove 55 of the metallic sleeve 52, the inner side of the spring member 58 falls within the annular groove 57 of the metallic rod 53, with the outer side of the spring member 58 remaining within the annular groove 55 of the metallic sleeve 52. Thus, the metallic rod 53 is locked with the metallic sleeve 52 at the specific position, without using the front plug 16 or stopper as used in the conventional fitting 10A.

The optical fiber fitting 10 thus assembled is then heated at the outer surface of the metallic sleeve 52 by a heater, and the gap between the metallic sleeve 52 and the coupling column 53C of the metallic rod 53 is filled with a molten metal 64, having a low melting point, in the vicinity of the rear end of the metallic sleeve 52. Thus, the forward ends of the optical fibers 12 are received in the optical device, while being sealed in the optical fiber fitting 10 for airtight.

Since the above embodiments are described only for examples, the present invention is not limited to the above embodiments and various modifications or alterations can be easily made therefrom by those skilled in the art without departing from the scope of the present invention. For example, the ring-like spring member may be a substantially half-ring spring so long as the spring member has the spring function. In addition, each of the fiber channels may receive therein a plurality of optical fibers.

What is claimed is:

1. An optical fiber fitting comprising:
   a cylindrical sleeve comprising an inner surface, said inner surface comprising thereon a first annular groove extending normal to an axial direction of said cylindrical sleeve;
   a ring-shaped spring member comprising a radially outer surface received in said first annular groove, with a radially inner surface of said spring member protruding from said first annular groove; and
   a rod member comprising a cylindrical portion received in said cylindrical sleeve,
   said cylindrical portion comprising on its outer surface at least one channel extending along said axial direction for receiving therein an optical fiber and a second annular groove extending normal to said axial direction for receiving therein said radially inner surface of said spring member,
   said spring member locking said rod member with said cylindrical sleeve.

2. The optical fiber fitting according to claim 1, wherein said rod member includes a second cylindrical portion at a rear side of said cylindrical portion, and a coupling portion for coupling together said cylindrical portion and said second cylindrical portion.

3. The optical fiber fitting according to claim 1, wherein said ring-shaped spring member comprising a "C" shaped portion.

4. The optical fiber fitting according to claim 1, wherein a gap between said cylindrical sleeve and a coupling portion of said rod member is filled with a metal to form an airtight seal.

5. The optical fiber fitting according to claim 1, wherein said channel receives therein a plurality of optical fibers.

6. The optical fiber fitting according to claim 1, wherein said cylindrical portion comprises a chamfer at a front edge thereof.

7. The optical fiber fitting according to claim 1, wherein said first cylindrical portion comprises a front cylindrical portion substantially adjacent to an optical device.

8. The optical fiber fitting according to claim 1, wherein said ring-shaped spring member is situated in said first annular groove so as to contact said second annular groove upon insertion of said rod member into said cylindrical sleeve.

9. The optical fiber fitting according to claim 1, wherein said cylindrical sleeve comprises a flange portion, and
wherein said first annular groove is situated above said flange portion.

10. The optical fiber fitting according to claim 1, wherein said first annular groove comprises a rectangular shape in a cross-sectional view.

11. The optical fiber fitting according to claim 1, wherein said second annular groove is situated in a vicinity of said first cylindrical portion.

12. The optical fiber fitting according to claim 1, wherein said ring-shaped spring member comprises a cutout portion.

13. The optical fiber fitting according to claim 1, wherein said first annular groove comprises a first diameter, and
wherein said ring-shaped spring member comprises an outer diameter smaller than said first diameter absent an external force.

14. The optical fiber fitting according to claim 1, wherein said first annular groove comprises a bottom surface with a first diameter, and
wherein said ring-shaped spring member comprises an outer diameter substantially equal to said first diameter upon application of an external force.

15. The optical fiber fitting according to claim 1, wherein said ring-shaped spring member comprises a central opening for passing optical fibers and said rod member.

16. The optical fiber according to claim 1, wherein said first cylindrical portion comprises a front end portion, and wherein optical fibers extend beyond said front end portion to reach an optical device.

17. The optical fiber fitting according to claim 2, wherein said coupling poriton comprises a diameter smaller than one of a diameter of said first cylindrical portion and a diameter of said second cylindrical portion.

18. An optical fiber fitting, comprising:
a cylindrical sleeve comprising an inner surface, said inner surface comprising therein a first annular groove;
a ring-shaped spring member comprising an outer surface received in said first annular groove, and an inner surface protruding from said first annular groove; and
a rod member comprising a cylindrical portion received in said cylindrical sleeve,
wherein said cylindrical portion comprising thereon a channel extending along an axial direction for receiving therein at least one optical fiber and a second annular groove for receiving therein said inner surface of said spring member,
said spring member locking said rod member with said cylindrical sleeve.

* * * * *